US006236451B1

(12) United States Patent
Wildenberg

(10) Patent No.: US 6,236,451 B1
(45) Date of Patent: May 22, 2001

(54) DISPLACEMENT DEVICE WITH LINEAR GUIDANCE, FOR MEASURING DISPLACEMENT OF THE LEGS OF A HEXAPOD

(75) Inventor: François Wildenberg, Contrexeville (FR)

(73) Assignee: Constructions Mécaniques des Marioni, Rozieres sur Mouzon (FR)

( * ) Notice: Subject to any disclaimer, the term of this patent is extended or adjusted under 35 U.S.C. 154(b) by 0 days.

(21) Appl. No.: 09/392,015

(22) Filed: Sep. 8, 1999

Related U.S. Application Data

(63) Continuation of application No. 09/004,944, filed on Jan. 9, 1998.

(30) Foreign Application Priority Data

Nov. 18, 1996 (FR) .................................................. 96 14340

(51) Int. Cl.⁷ .............................. G01N 21/00; G05G 1/00
(52) U.S. Cl. .................................................. 356/73; 74/469
(58) Field of Search ................................ 356/73; 74/469, 74/471; 318/625, 649, 687; 414/744.1, 744.2, 744.4

(56) References Cited

U.S. PATENT DOCUMENTS

| 5,392,663 |   | 2/1995 | Charles ................. 74/83.15 |
| 5,401,128 |   | 3/1995 | Lindem et al. ......... 409/132 |
| 5,604,593 | * | 2/1997 | McMurtry ............... 356/358 |
| 5,771,747 |   | 6/1998 | Sheldon ................ 74/490.01 |
| 5,813,287 | * | 9/1998 | McMurtry et al. ...... 74/490.06 |
| 5,903,125 | * | 5/1999 | Prentice et al. ........ 318/625 |
| 5,916,328 | * | 6/1999 | Pritschow et al. ...... 74/490.03 |

FOREIGN PATENT DOCUMENTS

WO 9103145    3/1991   (WO) .

* cited by examiner

*Primary Examiner*—Robert H. Kim
*Assistant Examiner*—Michael P. Stafira
(74) *Attorney, Agent, or Firm*—Gary M. Cohen

(57) ABSTRACT

A linear guidance device adapted for use in a machine tool such as a hexapod includes a rail having an open region which extends, either completely or partially, in a direction parallel to the longitudinal axis of the rail, and a ball screw having a nut which is fixed to the rail and which either completely or partially penetrates the open region of the rail.

12 Claims, 1 Drawing Sheet

DISPLACEMENT DEVICE WITH LINEAR GUIDANCE, FOR MEASURING DISPLACEMENT OF THE LEGS OF A HEXAPOD

This application is a continuation of 09/004,944 filed Jan. 9, 1998.

BACKGROUND OF THE INVENTION

The present invention is generally directed to a linear guidance device that can be used in machine tools. The device is particularly adapted for use with hexapod systems. However, the device can also be used with other types of systems, if desired.

European Patent No. 0 489 857 shows an example of a typical hexapod system. Such hexapod systems typically include linear guidance devices having a saddle (or slide) which is mounted for translational movement along a rail. However, such devices typically have the drawback of being highly unbalanced (asymmetric) and relatively bulky.

Accordingly, it is an object of the present invention to provide a linear guidance device that can be used in a machine tool such as a hexapod and which is better balanced.

It is also an object of the present invention to provide a linear guidance device that can be used in a machine tool such as a hexapod and which is less bulky.

SUMMARY OF THE INVENTION

These and other objects which will become apparent are achieved in accordance with the present invention by providing a linear guidance device that can be used in a machine tool such as a hexapod and which comprises, in combination, a rail having an open region which extends, either completely or partially, in a direction parallel to the longitudinal axis of the rail, and a ball screw having a nut which is fixed to the rail and which either completely or partially penetrates the open region of the rail. The nut may be fixed directly to the rail, or using other components.

In a first alternative embodiment, one end of the ball screw is longitudinally immobilized and rotationally driven. The saddle supported by the rail is also immobilized so that the saddle is prevented from rotating. In operation, rotation of the ball screw causes the nut, and as a result, the rail secured to the nut, to be displaced longitudinally. The advantage of such an arrangement is that a better working symmetry is obtained, with linear guidance, while at the same time achieving results which are at least identical to those of known devices, and with a less bulky device.

In an alternative embodiment, the reading head of a measurement rule is fixed to the nut of the ball screw.

In another alternative embodiment, the ball screw is driven in translation, and the nut is driven only in rotation.

The present invention will be better understood with reference to the detailed description which is provided below, together with the following drawings.

DETAILED DESCRIPTION OF PREFERRED EMBODIMENTS

Figure 1:
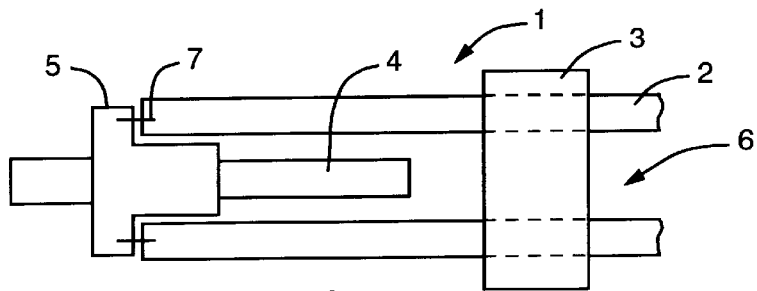
FIG. 1 is a longitudinal cross-sectional view of a linear guidance device produced in accordance with the present invention.

FIG. 1 shows a linear guidance device 1 which is generally comprised of a linear rail 2, a saddle 3 that can move relative to the rail 2 and which is guided by or on the rail 2, and a ball screw 4 which operates through an associated nut 5.

The rail 2 defines an open region 6, the axis of which is parallel to the longitudinal axis of the rail 2. These two axes may be the same, or may be different, as desired. The saddle 3 is prevented from rotating with respect to the rail 2. The nut 5 of the ball screw 4 is fixed to the rail 2, either directly or indirectly, by an appropriate fastener 7. The outer end of the ball screw 4 (relative to the open region 6) is immobilized longitudinally.

In operation, the ball screw 4 causes displacement of the nut 5, and in turn, the rail 2. The saddle 3 will remain longitudinally stationary with respect to the rail 2, and acts as a slideway.

A rule (not shown in FIG. 1) is generally provided for purposes of measuring movements of the linear guidance device, and the leg of the hexapod with which the linear guidance device is associated. The corresponding head for reading the rule (also not shown in FIG. 1) can be fixed either directly or indirectly to the nut 5 of the ball screw 4.

Figure 2:
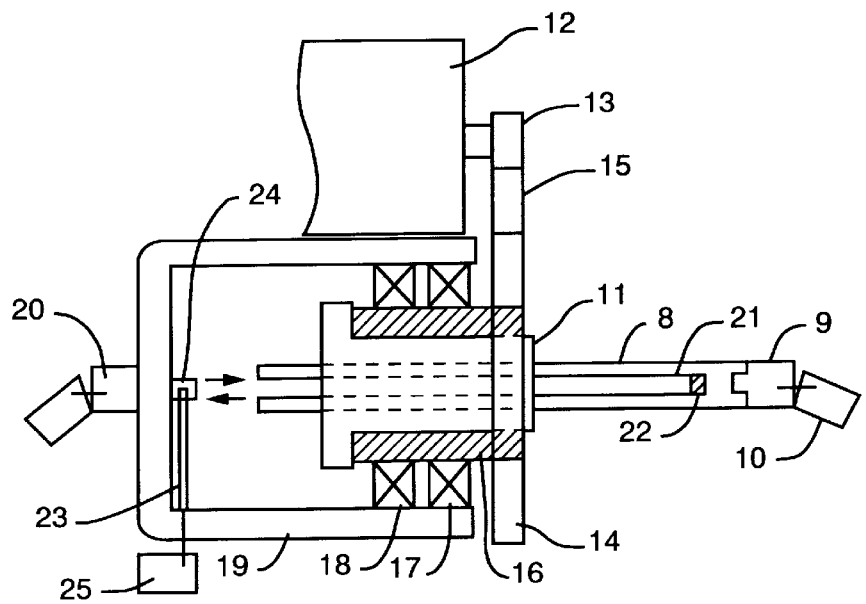
FIG. 2 is a longitudinal cross-sectional view of an alternative embodiment linear guidance device, for measuring the displacement of an associated screw using a laser beam.

Referring now to FIG. 2, an alternative embodiment linear guidance device is shown in which the ball screw is caused to translate. To this end, the ball screw 8 is associated with the two cardan joints 9, 10 of the leg of a hexapod, in this way allowing the length of the leg to be varied.

To this end, the nut 11 of the ball screw 8 is rotated by a motor 12 using a driving pulley 13 and a driven pulley 14 which are connected by a transmission belt 15. The nut 11 is mounted in a barrel 19 by a journal 16 and rolling bearings 17, 18. The barrel 19 forms a cage which is secured to a portion 20 of the corresponding hexapod leg and which is stationary in terms of translation.

Figure 3:
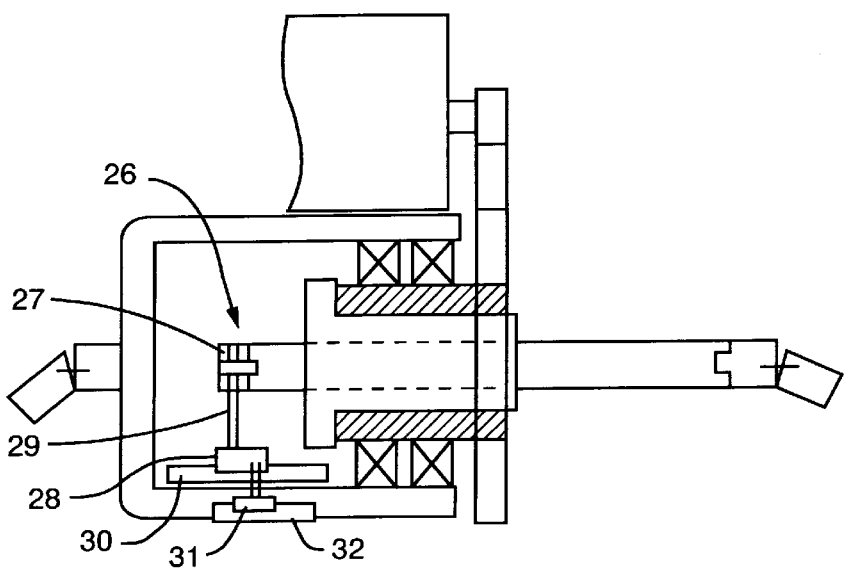
FIG. 3 is a longitudinal cross-sectional view of another alternative embodiment linear guidance device, for measuring the displacement of an associated screw using a measuring rule.

FIG. 3 shows a structure which is substantially similar to the structure shown in FIG. 2. However, the linear guidance device shown in FIG. 3 is further configured to solve a problem which can be experienced with known devices, which is that the ball screw (in addition to its main translational movement) can tend to experience a slightly "parasitic" secondary movement of oscillation about its axis, which can in turn result in a slightly wavy or "whiplash" movement. In practice, such movement has been found to make measurement of the actual displacement of the screw, and as a result, the hexapod leg, very difficult.

For the device shown in FIG. 2, and in accordance with the present invention, these (actual) measurements are obtained by making provisions for the ball screw 8 to be partially or totally bored with a blind hole 21. A mirror 22 is placed in the closed end of the bore 21. An optical fibre 23 is positioned between a laser optical unit 24 which is secured to the barrel 19, and a laser source and measuring device 25. This provides a compact and reliable system for accurately measuring the displacement of the leg. The optical fibre 23 can be replaced by any functionally equivalent system (e.g., a mirror with an angular return path, etc.), if desired.

For the alternative device shown in FIG. 3, an oscillating assembly 27 is provided. In the example shown, the oscillating assembly 27 includes appropriate bearings (e.g., ball-bearings, roller-bearings or needle-bearings) arranged at the free end 26 of the ball screw. The resulting assembly is connected by a mechanical link 29 to the saddle 28 of a linear guidance system 30. The saddle 28 and the linear guidance system 30 are in turn connected to a head 31 for reading a measuring rule 32.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A linear guidance device adapted for use in a machine tool including hexapod machine tools comprising:

a rail having a longitudinal axis;

an open region defined in the rail and having an axis which runs in a direction generally parallel to the longitudinal axis of the rail; and a ball screw associated with a cooperating nut, wherein the nut is fixed to the rail, and wherein the ball screw is received within the open region defined in the rail.

2. The linear guidance device of claim 1 wherein the open region extends substantially completely through the rail.

3. The linear guidance device of claim 1 wherein the open region extends only partially through the rail.

4. The linear guidance device of claim 1 wherein the ball screw extends completely through the open region of the rail.

5. The linear guidance device of claim 1 wherein the ball screw extends only partially through the open region of the rail.

6. The linear guidance device of claim 1 wherein the ball screw has an end opposite from the open region which is immobilized longitudinally.

7. The linear guidance device of claim 1 wherein the ball screw is associated with a pair of cardan joints associated with a leg of a hexapod, for varying the length of the leg.

8. The linear guidance device of claim 7 wherein the nut of the ball screw is rotated by a motor.

9. The linear guidance device of claim 8 wherein the nut is mounted to the linear guidance device by a journal, wherein rolling bearings extend between the journal and a barrel which forms a cage secured to portions of a corresponding hexapod leg, and wherein the hexapod leg is stationary in terms of translation.

10. The linear guidance device of claim 9 which further includes a driving pulley associated with the motor, a driven pulley associated with the nut, and a transmission belt connecting the driving pulley and the driven pulley.

11. The linear guidance device of claim 9 wherein the ball screw has a bore, and which further includes a mirror positioned in a closed end of the bore of the ball screw, and an optical fibre arranged between a laser optical unit secured to the barrel and a laser source and measuring device.

12. The linear guidance device of claim 9 which further includes an oscillating assembly associated with a free end of the ball screw, wherein the oscillating assembly is connected by a mechanical link to a saddle of a linear guidance system, which is in turn connected to a head for reading a measuring rule.

* * * * *